F. J. HOUZE.
DEVICE FOR FORMING GLASS CYLINDERS.
APPLICATION FILED AUG. 3, 1908.

941,148.

Patented Nov. 23, 1909.

Witnesses
H. C. Van Antwerp
Georgiana Chace

Inventor
Fred J. Houze
By Luther V. Moulton
Attorney

UNITED STATES PATENT OFFICE.

FERDINAND J. HOUZE, OF GRAND RAPIDS, MICHIGAN, ASSIGNOR OF TWO-THIRDS TO JOHN H. HOUZE AND NOEL HOUZE, OF GRAND RAPIDS, MICHIGAN.

DEVICE FOR FORMING GLASS CYLINDERS.

941,148.

Specification of Letters Patent. Patented Nov. 23, 1909.

Application filed August 3, 1908. Serial No. 446,623.

*To all whom it may concern:*

Be it known that I, FERDINAND J. HOUZE, a citizen of the United States of America, residing at Grand Rapids, in the county of Kent and State of Michigan, have invented certain new and useful Improvements in Devices for Forming Glass Cylinders; and I do hereby declare the following to be a full, clear, and exact description of the invention, such as will enable others skilled in the art to which it appertains to make and use the same.

My invention relates to improvements in devices for forming glass cylinders for making window glass and like purposes, and its object is to provide a device that will form a cylinder of uniform thickness throughout; to provide means for maintaining uniform temperature of the melted glass; to provide means for preventing too rapidly cooling of the cylinder when formed; and to provide the device with various new and useful features hereinafter more fully described and particularly pointed out in the claims.

Figure 1:
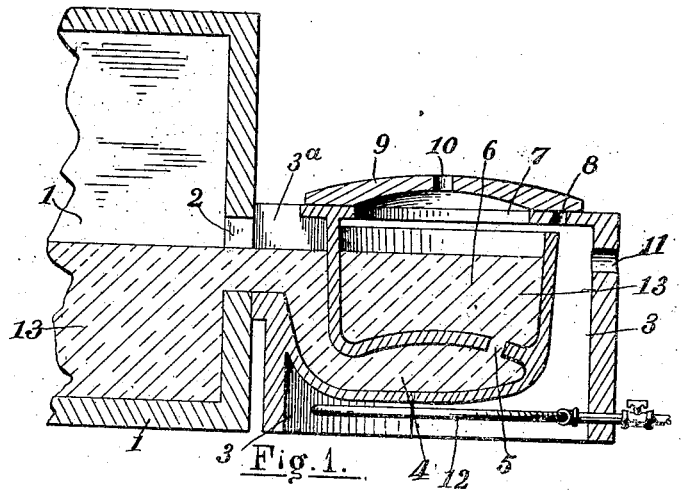
Figure 2:
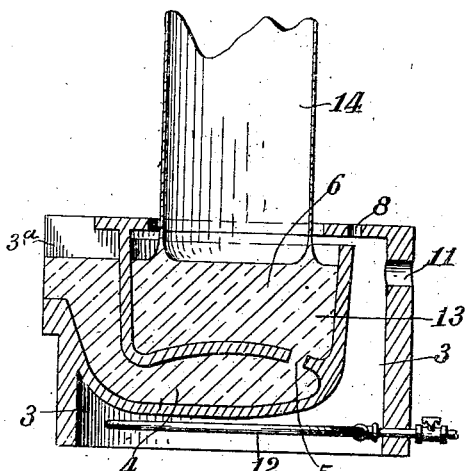
Figure 3:
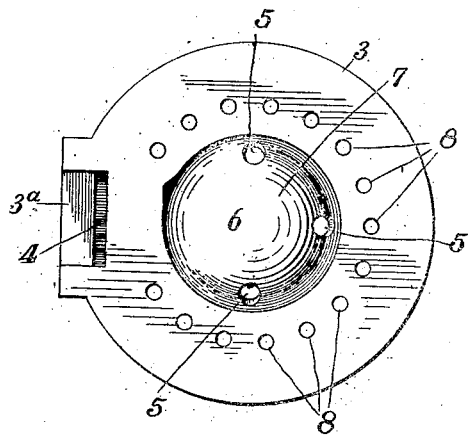

Reference is had to the accompanying drawings, in which:

Figure 1 is a vertical section of the device embodying my invention: Fig. 2 the same with the cover removed, and as it appears when in operation: Fig. 3 a plan view of the part of the device shown in Fig. 2.

Like numbers refer to like parts in all of the figures.

1 represents the tank in which the glass is melted, the same being provided with an overflow opening 2.

3 is a cylindrical case having a lateral opening opposite the opening 2 to receive the melted glass and a downward and horizontally extended passage 4 under the pot 6, said pot having a double bottom forming the horizontal portion of the passage 4 in the upper wall of which bottom is a number of openings 5 through which the melted glass may pass into the upper part of the pot 6. Above this pot is the top of the casing 3, which is horizontally disposed and has a circular opening 7 above the pot 6, surrounding which opening and spaced apart therefrom a short distance, are a series of small openings 8.

9 is a cover adapted to close all of the openings in the top, in the center of which cover is an opening 10 which affords a draft for the escape of a portion of the heat from the burner 12 placed below the pot 6.

13 represents the fluid glass, which in the process of producing glass cylinders, is drawn upward as at 14 through the opening 7 by any of the well known means. The heat and flame from the burner 12 escaping through the openings 8 surrounds the cylinder and maintains the temperature thereof sufficient to prevent too sudden cooling.

11 is an opening by which the device may be connected by a suitable pipe to a chimney or stack, if preferred.

In operation, the melted glass passing downward and thence laterally in the passage 4 is exposed to the heat of the burner 12 and prevented from cooling therein and thence flows upward through the opening 5, being thereby uniformly distributed in the pot 6 and its temperature uniformly maintained therein by the flames from the burner 12 surrounding said pot. By this construction and the consequent uniform temperature of the glass in the pot 6, the cylinder 14 will be of substantially uniform thickness throughout and will be cooled slowly, the heat of said cylinder being maintained as it slowly rises by means of the flames escaping through the openings 8.

What I claim, is:—

1. A device for forming glass cylinders, comprising a melting tank; a pot near the same and communicating therewith by a side opening and a passage extending downward at the side of the pot next the tank and thence beneath the pot whereby the pot is heated at one side only by the tank and incoming glass, said pot being also provided with one or more bottom openings to admit the glass to that part only of the pot which is not so heated, whereby the heat is rendered more uniform throughout the glass in the pot.

2. A device for forming glass cylinders, comprising a melting tank having a side opening, a jacket having a side opening to receive the melted glass, and also having a top provided with a central opening and series of small openings concentric therewith, an inner pot having a downward and horizontally extended passage to receive the glass, and openings in the upper wall of said passage to permit the glass to pass into said pot, and means for applying heat to the inner pot.

3. In a device for forming glass cylinders, the combination of a melting tank having a lateral opening, a cylindrical case having an opening to receive the glass, an inner pot in said case having a downward and horizontally extended passage beneath the same and also having openings in the upper wall of said passage to permit the glass to pass therethrough, and a top to said case having a circular central opening and a series of small openings concentric therewith, a cover adapted to close the openings in said top and having a central opening, the cover also being spaced apart from the top of the inner pot.

In testimony whereof I affix my signature in presence of two witnesses.

FRED. J. HOUZE

Witnesses:
GEORGIANA CHACE,
LUTHER V. MOULTON.